United States Patent Office 3,751,422
Patented Aug. 7, 1973

3,751,422
PROCESS FOR PRODUCING BIPYRIDYLS
Roy Dennis Bowden, Runcorn, England, assignor to Imperial Chemical Industries Limited, London, England
No Drawing. Filed June 24, 1970, Ser. No. 57,387
Claims priority, application Great Britain, July 8, 1969, 34,414/69
The portion of the term of the patent subsequent to Mar. 21, 1989, has been disclaimed
Int. Cl. C07d 31/02, 31/10
U.S. Cl. 260—296 D
12 Claims

ABSTRACT OF THE DISCLOSURE

A process for the manufacture of bipyridyls, known for their herbicidal properties, which comprises the step of reacting a corresponding substituted pyridine in the liquid phase with ammonia, optionally in the presence of a hydrogenation/dehydrogenation catalyst, to give bipyridyl or a piperidyl pyridine which is readily dehydrogenated to a bipyridyl.

---

This application relates to our copending application, Ser. No. 804,993, now U.S. Pat. 3,651,071.

This invention relates to the manufacture of pyridine derivatives and particularly to a process for use in the manufacture of bipyridyls from substituted pyridines.

According to the present invention we provide a process for use in the manufacture of bipyridyls which comprises the step of reacting the corresponding substituted pyridine in the liquid phase with ammonia, the substituted pyridine being a 2-(pyridyl)-tetrahydropyran or a 2 - (pyridyl) - tetrahydrothiopyran, a 4-(pyridyl)-tetrahydropyran or a 4-(pyridyl)-tetrahydrothiopyran, or a substituted pyridine wherein the substituent is a group of the structural formula —C(R)(R$_1$)(R$_2$) wherein R represents a hydrogen atom, a halogen atom, a hydroxy group, an alkoxy group or an amino group, and R$_1$ and R$_2$ each represents a group of the general formula

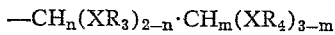

—CH$_n$(XR$_3$)$_{2-n}$·CH$_m$(XR$_4$)$_{3-m}$ wherein X represents an atom of oxygen or sulphur, n is 0, 1 or 2 and m is 1 or 2, and R$_3$ and R$_4$ each represents a hydrogen atom or an alkyl, alkene, aryl, alkaryl, aralkyl or cycloaliphatic group. In the pyridine derivatives (including the pyridyl tetrahydropyrans and pyridyl tetrahydrothiopyrans), the substituent may be in the 2, 3 or 4 position in the pyridine nucleus.

The reaction may be carried out in the presence of hydrogen and is preferably carried out at superatmospheric pressure. Especially, pressures over 10 atmospheres may be employed.

The substituted pyridine starting material in the liquid phase is heated with ammonia at a temperature of from 150° C. to 450° C., preferably 200° C. to 350° C., usually in the presence of a hydrogenation/dehydrogenation catalyst. Suitable catalysts are the transition metals and their oxides and salts, for example the platinum metals, the Raney metals, nickel, cobalt, copper, chromium and copper chromite. The salts may be, for example, sulphides, and the catalyst may be unsupported or supported, for example, nickel supported on kieselguhr.

The substituted pyridine starting material may be employed in the bulk form or it may be in the form of a solution in a solvent which is preferably inert to the reactants. If a solvent is employed it is preferably, but not necessarily, of a sufficiently high boiling point that it remains in the liquid phase throughout the reaction. Examples of suitable organic solvents are ethers and thioethers for example tetrahydrofuran, 1,2-dimethoxyethane, bis-(2-methoxyethyl) ether, 1,4-dioxane and thiophene, ketones, for example acetone; hydrocarbons, for example benzene, toluene, xylene and hexane; organic bases, for example pyridine; halogenated hydrocarbons and particularly chlorinated hydrocarbons, for example chlorobenzene, chloroform, carbon tetrachloride and methylene dichloride; amides, particularly tertiary alkylamides, for example dimethyl formamide; sulphoxides, for example dimethyl sulphoxide; sulphones, for example sulpholane; nitriles, for example acetonitrile; alcohols, for example ethanol; nitro compounds, for example nitropropane; and alkyl carbonates and sulphates, for example propylene carbonate and dimethyl sulphate. Polar aprotic solvents, especially dimethyl sulphoxide, are particularly suitable solvents in the case where a pyridyl tetrahydro (thio) pyran is used, as also are mixtures of water and alcohols. Water or liquid ammonia may be used as the solvent and mixtures of solvents may be used.

The ammonia may be in the form of a liquid solution but is preferably substantially anhydrous, in which case it can be added as a gas or a liquid. The reaction is preferably carried out under superatmospheric pressure for example in an autoclave. The desired pressure is achieved conveniently by introducing hydrogen or nitrogen gas into the reaction vessel.

The amounts of the substituted pyridine and the ammonia present may vary within wide limits but usually will be from 0.5 to 2 moles of ammonia per mole of the substituted pyridine derivative. However, a large excess of ammonia over the theoretical amount may be employed, for example to establish superatmospheric pressure within the reaction vessel or to act as solvent for the substituted pyridine.

The product of the reaction between the substituted pyridine derivative and the ammonia may be the desired bipyridyl or it may be the corresponding piperidyl pyridine which is readily dehydrogenated to the bipyridyl using a dehydrogenation catalyst. Whether the bipyridyl or the piperidyl pyridine is produced depends to some extent upon the particular catalyst used and the reaction conditions; the use of more efficient dehydrogenation catalyst, somewhat lower pressures, the presence of a hydrogen acceptor, and higher temperatures all favour the production of the bipyridyl. Of course, the reaction products often contain both the bipyridyl and the piperidyl pyridine. Catalyst which favour the production of the bipyridyl include, for example, platinum metals, copper chromite and Raney nickel. The catalyst may be supported on, for example, kieselguhr, or may be unsupported.

Moreover, since production of the bipyridyl involves a dehydrogenation reaction it is advantageous, when it is desired to obtain the bipyridyl as the direct product, to carry out the reaction in the absence of added hydrogen and to have present a hydrogen acceptor for example benzene, pyridine, acetonitrile or oxygen, conveniently in the form of air. The presence of some hydrogen may be desirable, however, since hydrogen enables the activity of some catalysts to be maintained for longer periods of time.

The bipyridyls or piperidyl pyridines for conversion to bipyridyls can be isolated by cooling the reaction mixture to room temperature and then extracting the bipyridyl with an organic solvent, for example methanol. The catalyst residues can be separated by filtration to yield a solution from which the bipyridyl can be isolated by evaporation of the solvent.

The process of the invention is particularly suitable for the manufacture of 4,4'-bipyridyls although other isomers, particularly 2,2'-, 2,4'-, 2,3'- and 3,4'-bipyridyls, can be manufactured by choice of an appropriate substituted pyridine starting material. The bipyridyls produced by the process of the invention are useful as intermediates in the production of N,N'-disubstituted bipyridylium salts, well known for their herbicidal properties.

The starting materials for use in the process are substituted pyridines wherein the substituent is a tetrahydropyranyl or tetrahydrothiopyranyl group or a group of the formula —$C(R)(R_1)(R_2)$ as hereinbefore defined.

Substituted pyridine derivatives which may be used wherein the substituent is a tetrahydropyranyl group have the basic general formula

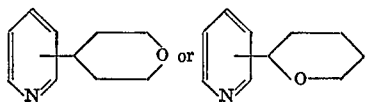

and other derivatives which may be used are those having these formulae but wherein one or both of the heterocyclic structures carrries an inert substituent, for example an alkyl group. The corresponding pyridyl tetrahydrothiopyranyls may be used. Such compounds are more fully described in our said copending applicaton Ser. No. 804,993 filed Mar. 6, 1969, which has matured into U.S. Pat. No. 3,651,071.

4-(pyridyl)-tetrahydropyrans or tetrahydrothiopyrans can be prepared by reacting a 2'-haloethyl-3-(pyridyl)-propylether or thioether respectively with an active alkali metal compound. 2-(pyridyl)-tetrahydropyrans or tetrahydrothiopyrans can be prepared by reacting the appropriate pyridyl Grignard reagent with a 2-halotetrahydropyran or tetrahydrothiopyran. Alternatively, pyridyl tetrahydropyrans or tetrahydrothiopyrans can be prepared by heating a pyridyl alkane diol or dithiol at a temperature of at least 250° C., preferably in the presence of a catalyst. These preparations are more fully described in our said copending application Ser. No. 804,993 filed Mar. 6, 1969, which has matured into U.S. Pat. No. 3,651,071.

Substituted pyridine derivatives wherein the substituent has the formula —$C(R)(R_1)(R_2)$ can be prepared by reacting the appropriate pyridine derivative with a metal amide or an organolithium compound and a halogenated organic compound. Alternatively compounds wherein $R_1$ and $R_2$ are the group —$CH_2 \cdot CH_2OH$ or —$CH_2 \cdot CH_2SH$ can be prepared by reacting an alkyl pyridine with a metal amide or an organolithium compound and with ethylene oxide or ethylene sulphide respectively. These preparations also are more fully described in our said copending application Ser. No. 804,993 filed Mar. 6, 1969, which has matured into U.S. Pat. No. 3,651,071.

The invention is illustrated but in no way limited by the following examples.

EXAMPLE 1

A mixture of Raney nickel (1.0 g.), 3-(4-pyridyl-pentane-1,5-diol (9.05 g.) and ammonia (75 g.) were sealed in an autoclave. Hydrogen gas was introduced until the pressure within the autoclave was 1000 p.s.i.g. The mixture was heated at 240° C. for 6 hours after which time it was cooled to room temperature. The pressure was released and the residue was extracted into methanol and filtered. The solvent was evaporated to yield 4-(4-piperidyl)-pyridine (M.P. 82° C.—quantitative yield).

The above procedure was repeated 15 times (Experiments Nos. 2 to 16) using the pyridine derivatives and reaction conditions shown in the table below in which the results are also shown. In the table, the catalysts are identified by references as follows:

A—Raney nickel
B—Copper chromite
C—Raney nickel+Adams catalyst
D—Raney nickel+copper chromite

TABLE 1

| Experiment No. | Substituted pyridine | Catalyst | Solvent | Temperature (° C.) | Time (hrs.) | Initial, p.s.i.g. $H_2$ | Maximum pressure, atm. | Percent of 4,4-bipyridyl | Percent of 4-(4-piperidyl)-pyridine |
|---|---|---|---|---|---|---|---|---|---|
| 1 | 3-(4-pyridyl)-pentane-1,5-diol | A |  | 240 | 6 | 1,000 |  | Nil | 100 |
| 2 | do | C |  | 300 | 5 | 250 |  | Nil | 35 |
| 3 | do | C |  | 250 | 5 | 250 |  | Nil | 46 |
| 4 | do | D |  | 350 | 5 | 50 |  | 12 | 52 |
| 5 | do | B |  | 350 | 5 | 50 |  | 6 | 28 |
| 6 | do | D |  | 280 | 5 | 50 |  | 1 | 18 |
| 7 | do | B |  | 350 | 5 | 50 |  | 3 | 6 |
| 8 | do | B | $NH_3$ | 350 | 16 | 50 |  | 18 | 43 |
| 9 | do | B | $NH_3/CH_3CN$ | 350 | 4 | 0 | 445 | 15 | Nil |
| 10 | do | B | $NH_3/CH_3CN$ | 275 | 4 | 0 | 244 | 5 | Nil |
| 11 | 3-(4-pyridyl)-pentane-1,5-diethyl ether | A | $NH_3$ | 300 | 6 | 50 | 350 | 4.2 | Nil |

|  |  |  |  |  |  |  |  | 2,3'-bipyridyl | 2-(4-piperidyl)-pyridine |
|---|---|---|---|---|---|---|---|---|---|
| 12 | 3-(2-pyridyl)-pentane-1,5-diol | B | $NH_3$ | 350 | 16.5 | 50 | 445 | 9 | Nil |
| 13 | do | B | $NH_3/CH_3CN$ | 300 | 4 | 0 | 492 | 1.6 | Nil |
| 14 | do | A | $NH_3$ | 240 | 6 | 300 | 315 | Nil | 1.5 |
| 15 | do | A | $NH_3/EtOH$ | 240 | 6 | 300 | 232 | Nil | [1] 75 |
| 16 | do | A | $NH_3$ | 240 | 4 | 300 | 230 | Nil | 100 |

[1] Product also contained N-ethyl-2-(4-piperidyl)-pyridine.

4-(2-pyridyl)-piperidine, a novel compound was identified by the following physical and spectral data:

B.P.—102–109°/1 mm. Hg
I.R.—$\nu_{max.}$ (liquid film) 2930, 2850, 2810, 1570, 1530, 1470, 1440, 1430, 1310, 1130, 770 and 740 cm.$^{-1}$
NMR—$^2[(CD_3)_2CO]$ 1.45, 2.35, 2.8, 6.7–8.5 (Relative intensities 1:1:2:10)

$$M.S. - \frac{M}{e} = 162.1157 \left( C_{10}H_{14}N_2 \text{ has } \frac{M}{e} = 162.1157 \right)$$

EXAMPLE 2

The procedure of Example 1, Expt. 1 was repeated except that the addition of hydrogen gas was excluded. The product was 4-(4-piperidyl)-pyridine in 45% yield.

EXAMPLE 3

Ferric nitrate (0.1 g.) was added to stirred liquid ammonia (3 litres) at −30° C. in an autoclave. Sodium metal (17 g.) was added to the stirred mixture over a period of 45 minutes and gamma-picoline (23.3 g.) was then added over a period of 3 minutes. The resulting solution was stirred for 90 minutes during which time a yellow colouration developed.

After this time liquid ethylene oxide (27 g.) was added to the mixture and stirred for 5 hours. Solid ammonium chloride (28 g.) was then added in small quantities and the mixture was allowed to stand overnight after which time the major portion of the ammonia was evaporated.

To the residual suspension was added Catalyst B (2 g.),

5% Pd/C (1 g.) and benzene (20 mls.). The vessel was then sealed and heated to 350° C. for 6 hours during which time the pressure increased to 420 atmospheres. The vessel was cooled and the excess pressure was released by venting through methanol traps. The contents of the vessel were washed out with methanol, combined with the contents of the traps and analysed for 4,4'-bipyridyl by gas/liquid chromatography. The yield of 4,4'-bipyridyl was 25%.

Also identified were:

gamma-picoline
3(4-pyridyl)-propanol
3(4-pyridyl)propyl-1-amine
4(4-pyridyl)-tetrahydropyran.

3(4-pyridyl)-propyl-1-amine (a novel compound) was characterised by the following physical and spectral data:

B.P.—98–105°/2 mm. Hg
I.R.—(liquid film) $\nu_{max}$. 3350, 2950, 1600, 1560, 1405, 1220 and 990 cm.$^{-1}$
N.M.R.—$^2$(CDCl$_3$) 1.5, 2.88, 7.3 and 8.25 (Relative intensities 2:2:4:4)

M.S. $\frac{M}{\epsilon}$—136.0999 $\left(C_8H_{12}N_2 \text{ has } \frac{M}{\epsilon}\text{—}136.1000\right)$

EXAMPLE 4

This example demonstrates the conversion of piperidyl pyridine to bipyridyl.

The procedure of Example 1 was repeated four times except that the addition of hydrogen gas was excluded and a hydrogen acceptor (benzene) was included as solvent instead of ammonia. The substituted pyridine was 4(4-piperidyl)pyridine and the reaction was carried out under an atmosphere of nitrogen.

TABLE 2

| Experiment No. | Catalyst | Temperature (° C.) | Time (hrs.) | Pressure (atm.) at— Initial | Pressure (atm.) at— Maximum | Percent of— 4,4'-pyridyl | Percent of— 4-(4-piperidyl)-pyridine |
|---|---|---|---|---|---|---|---|
| 1 | 5% Pd on charcoal | 350 | 6 | 50 | 95 | 81 | |
| 2 | B | 350 | 6 | 50 | 98 | 22 | |
| 3 | B | 250 | 6 | 50 | 82 | 45 | 55 |
| 4 | B | 250 | 6 | 50 | 88 | 20 | 55 |

What is claimed is:

1. A process for use in the manufacture of bipyridyls which consists essentially of the step of reacting the corresponding substituted pyridine in the liquid phase with ammonia at 150° to 450° C. and under superatmospheric pressure of at least 10 atmospheres and in the presence of a catalyst which is a transition metal or transition metal oxide or salt selected from the group consisting of the platinum metals, Raney metals, nickel, cobalt, copper and chromium or copper chromite, the substituted pyridine being a 2-(pyridyl)-tetrahydropyran or a 2-(pyridyl)-tetrahydrothiopyran, a 4-(pyridyl)-tetrahydropyran or a 4-(pyridyl)-tetrahydrothiopyran, or a substituted pyridine wherein the substituent is selected from group consisting of pentane-1,5-diol or pentane-1,5-diethyl ether.

2. A process as claimed in claim 1 wherein the superatmospheric pressure is greater than 10 atmospheres and up to about 492 atmospheres.

3. A process as claimed in claim 1 wherein the temperature is 200° C. to 350° C.

4. A process as claimed in claim 1 wherein the said catalyst is Raney nickel.

5. A process as claimed in claim 1 wherein the said catalyst is copper chromite.

6. A process as claimed in claim 1 wherein the step of reacting the substituted pyridine with ammonia is carried out in liquid ammonia as a solvent.

7. A process as claimed in claim 1 wherein the step of reacting the substituted pyridine in the liquid phase with ammonia is carried out in the presence of hydrogen.

8. A process as claimed in claim 1 wherein the step of reacting the substituted pyridine in the liquid phase with ammonia is carried out in the absence of added hydrogen and the presence of a hydrogen acceptor.

9. A process as claimed in claim 8 wherein the hydrogen acceptor is a solvent in which the pyridine starting material is dissolved.

10. A process as claimed in claim 9 wherein the hydrogen acceptor is acetonitrile or benzene.

11. A process as claimed in claim 1 wherein the ammonia is substantially anhydrous.

12. A process as claimed in claim 1 wherein the substituted pyridine used is selected for the production of a 2,2'- or 4,4'-bipyridyl.

References Cited
UNITED STATES PATENTS
3,651,071  3/1972  Bowden _____ 260—296 D ALAN L. ROTMAN, Primary Examiner U.S. Cl. X.R.
260—293.69, 294.8 D, 297 R, 296 R